US012136359B2

(12) United States Patent
Ferreira

(10) Patent No.: US 12,136,359 B2
(45) Date of Patent: Nov. 5, 2024

(54) PACKAGING LABEL

(71) Applicant: AMGEN INC., Thousand Oaks, CA (US)

(72) Inventor: Diogo Ferreira, Thousand Oaks, CA (US)

(73) Assignee: AMGEN INC., Thousand Oaks, CA (US)

(*) Notice: Subject to any disclaimer, the term of this patent is extended or adjusted under 35 U.S.C. 154(b) by 104 days.

(21) Appl. No.: 17/916,124

(22) PCT Filed: Mar. 30, 2021

(86) PCT No.: PCT/US2021/024781
§ 371 (c)(1),
(2) Date: Sep. 30, 2022

(87) PCT Pub. No.: WO2021/221845
PCT Pub. Date: Nov. 4, 2021

(65) Prior Publication Data

US 2023/0135301 A1 May 4, 2023

Related U.S. Application Data

(60) Provisional application No. 63/016,792, filed on Apr. 28, 2020.

(51) Int. Cl.
*G09F 3/02* (2006.01)

(52) U.S. Cl.
CPC .... *G09F 3/0288* (2013.01); *G09F 2003/0222* (2013.01); *G09F 2003/023* (2013.01); *G09F 2003/0269* (2013.01); *G09F 2003/0272* (2013.01)

(58) Field of Classification Search
CPC .......... G09F 3/0288; G09F 2003/0222; G09F 2003/023; G09F 2003/0269; G09F 2003/0272
See application file for complete search history.

(56) References Cited

U.S. PATENT DOCUMENTS

| | | | | |
|---|---|---|---|---|
| 4,110,502 A * | 8/1978 | Baer | G09F 3/10 283/79 |
| 6,254,138 B1 * | 7/2001 | Rawlings | B42D 15/006 283/105 |
| RE48,366 E * | 12/2020 | Van Gorp | G09F 3/10 |

(Continued)

FOREIGN PATENT DOCUMENTS

| | | |
|---|---|---|
| GB | 2493905 A | 2/2013 |
| WO | WO-2013186309 A1 | 12/2013 |

OTHER PUBLICATIONS

International Search Report and Written Opinion issued to international application No. PCT/US2021/024781, dated Jun. 23, 2021.

*Primary Examiner* — Gary C Hoge
(74) *Attorney, Agent, or Firm* — MARSHALL, GERSTEIN & BORUN LLP

(57) ABSTRACT

A carton closure label is provided. The carton closure includes a first layer having a first adhesion value and a perforated portion extending at least substantially across a dimension of the first layer. The carton closure also includes a second layer removably coupled with the first layer, the second layer having a second adhesion value that is less than the first adhesion value.

20 Claims, 3 Drawing Sheets

(56) References Cited

U.S. PATENT DOCUMENTS

| | | | | |
|---|---|---|---|---|
| 2004/0108237 | A1* | 6/2004 | McClintock | G09F 23/00 206/459.1 |
| 2009/0269537 | A1* | 10/2009 | Manabe | G09F 3/10 428/343 |
| 2012/0234481 | A1 | 9/2012 | Raming | |
| 2016/0189573 | A1* | 6/2016 | Bush | G09F 3/0288 427/7 |
| 2020/0365060 | A1* | 11/2020 | Kammerer | G09F 3/02 |
| 2023/0230509 | A1* | 7/2023 | Young | B32B 29/005 40/638 |

* cited by examiner

PACKAGING LABEL

CROSS-REFERENCE TO RELATED APPLICATION

This is the United States national phase of International Patent Application No. PCT/US21/24781, filed Apr. 11, 2021, which claims priority to U.S. provisional patent application No. 63/016,792, filed Apr. 28, 2020, the entire contents of each of which are hereby incorporated by reference herein.

FIELD OF DISCLOSURE

The present disclosure generally relates to carton closure labels, more particularly, to multi-level carton closure labels and packaging assemblies that may be suitable for pharmaceutical products.

BACKGROUND

Product packaging often must serve various different functions and balance different requirements that may be competing. For example, it may be desirable and/or required that product packaging fulfils certain integrity specifications such as a minimal force required to open the product packaging. Additionally or alternatively, it may be desirable to include a tamper-proof or tamper-resistant seal (such as a carton closure label) along a packaging seal or opening point. As another example, it may be desirable that product packaging is user friendly, such as easy-to-open features. Additionally or alternatively, it may be desirable to include product information on the packaging and, more specifically, on a packaging label such as the carton closure label.

These and other functions and requirements may be particularly evident and/or heightened for product packaging utilized with certain types of products. For example, these functions and requirements may be particularly desirable in the pharmaceutical space and other product spaces where product physical security, fragility, integrity, labeling, and/or relative cost of the product is present.

As described in more detail below, the present disclosure sets forth carton closure labels and packaging assemblies that may be suitable for pharmaceutical products that may address one or more of the challenges or needs mentioned herein, as well as provide other benefits and advantages.

SUMMARY

In accordance with an aspect, a carton closure label is provided, including a first layer having a first adhesion value and a perforated portion extending at least substantially across a dimension of the first layer. The label may also include a second layer removably coupled with the first layer, the second layer having a second adhesion value that is less than the first adhesion value.

The carton closure label may have the second layer positioned over the first layer such that a bottom side of the second layer contacts a top side of the first layer, and wherein the second layer covers at least a substantial portion of the first layer.

The second layer may also include a peel-up portion facilitating grip of the second layer for removal from the first layer. In one design, the second layer does not include a perforated portion. The second layer may be at least partially transparent such that information on the first layer is visible when the two layers are coupled with each other.

The first layer may have a first tear strength and the second layer may have a second tear strength that is lower than the first tear strength.

The second layer may include an adhesive that, when de-coupled from the first layer, significantly loses an adhesive strength between the first and second layers.

The carton closure label may be utilized in a packaging assembly, such as a packaging assembly for a pharmaceutical product. As an example, the packaging assembly may include a secondary packaging for receiving a pharmaceutical product and the carton closure label may be coupled with the secondary packaging. For example, the first layer may have a bottom side coupled with the secondary packaging and a top side that is coupled with the second layer.

BRIEF DESCRIPTION OF THE DRAWINGS

The above needs are at least partially met through provision of the carton closure label described in the following detailed description, particularly when studied in conjunction with the drawings, wherein.

The accompanying figures show embodiments according to the disclosure and are exemplary rather than limiting.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The present disclosure generally relates to a carton closure label and/or a packaging system utilizing a carton closure label. The carton closure labels and/or systems utilizing the same may offer several desirable features, such as easy-open features, tamper-proof features, authenticity features, and/or other product information. As a more specific example, the carton closure label may include a first layer having a first adhesion value and a perforated portion extending at least substantially across a dimension of the first layer. The label may also include a second layer removably coupled with the first layer, the second layer having a second adhesion value that is less than the first adhesion value.

Figure 1A:
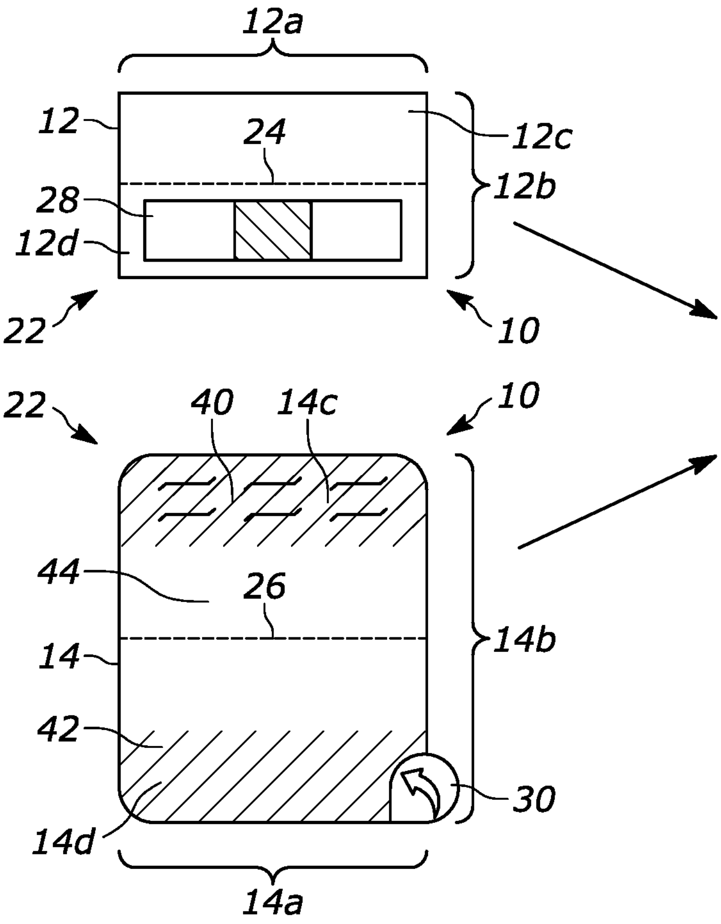
FIG. 1 illustrates a carton closure label in both the exploded view (FIG. 1*a*) and the assembled view (FIG. 1*b*), in accordance with various embodiments.
Figure 1B:
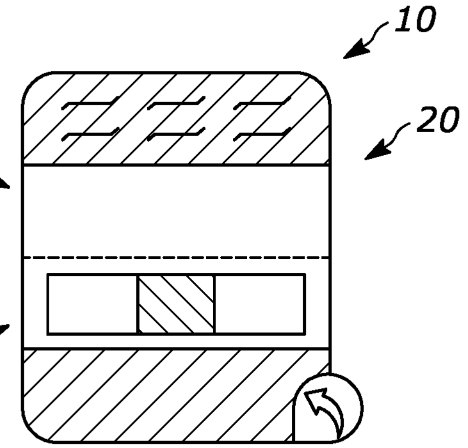

Referring to the Figures, a carton closure label having at least two layers is disclosed. For example, FIG. 1*b* shows a carton closure label 10 in its combined state 20 and FIG. 1*a* shows the carton closure label 10 in its de-coupled state 22, namely with a first layer 12 and a second layer 14 de-coupled from each other. The first layer 12 is configured to be the bottom layer of the dual-layer carton closure label 10 and thus is configured to be coupled to the packaging (as will be discussed in more detail below). The first layer 12 shown in FIGS. 1*a* and 1*b* may also include a perforation 24 extending along at least a substantial portion of the first layer 12 to facilitate opening of the packaging. More specifically, the perforation 24 shown in FIGS. 1*a* and 1*b* extends completely across a dimension of the first layer 12, such as the width 12*a* or the length 12*b*. The perforation 24 includes a series of indentations, perforations, slots, and/or other features that allow a user to separate the first layer 12 into two sections 12*c*, 12*d*. In other words, the perforation 24 serves as a relatively easy-open feature, especially when the second layer 14 has been de-coupled from the first layer 12. The first layer 12 may also include product and/or packaging information 28. As a more specific example, the information 28 may include a seal of authenticity, a product bar code, information identifying or relating to the contents of the packaging, product source information, shipping information, care information, or other desirable information. The information 28 preferably is aligned with a translucent or transparent portion of the second layer 14 such that the information 28 is visible when the layers 12, 14 are coupled or de-coupled.

The second layer 14 shown in the figures may have a width 14*a* and/or a length 14*b* that matches the width 12*a* and/or length 12*b* of the first layer 12 such that the two layers 12, 14 may appear to be and/or function as a single label at times. For example, the respective widths of the two labels 12*a*, 14*a* are substantially equal such that in the combined state 20 the two layers 12, 14 completely overlap with each other along that dimension. The second layer shown in the Figures has a length 14*b* that is greater than the length of the first layer 12*b* to facilitate allow room for additional information on the second layer 14 and/or to facilitate easy removal of the two layers. For example, the second layer 14 may include packaging and/or product information 40, 42, and/or 44. As a more specific example, the information 40, 42, and 44 may include a seal of authenticity, a product bar code, information identifying or relating to the contents of the packaging, product source information, shipping information, care information, or other desirable information. The second layer 14 shown in FIGS. 1*a* and 1*b* includes a perforation 26 extending along at least a substantial portion of the second layer 14 to facilitate opening of the packaging. More specifically, the perforation 26 shown in FIGS. 1*a* and 1*b* extends completely across a dimension of the second layer 14, such as the width 14*a* or the length 14*b*. The perforation 26 includes a series of indentations, perforations, slots, and/or other features that allow a user to separate the second layer 14 into two sections 14*c*, 14*d*. In other words, the perforation 26 serves as a relatively easy-open feature.

The second layer 14 may include an easy-peel portion 30 that facilitates de-coupling of the second layer 14 from the first layer 12. As a more specific example, the second layer 14 shown in the figures includes a peel-up portion 30 that facilitates grip on the second layer 14 for removal from the first layer 12 and/or the packaging. For example, the peel-up portion 30 may not include an adhesive component or may include an adhesive component with a relatively low adhesion value. As shown in the figures, the peel-up portion 30 may include an indicator arrow to indicate to the user where/how to grip the peel-up portion 30.

The second layer 14 may include a second adhesion value that is lower than a first adhesion value of the first layer 12 to thereby facilitate removal of the second layer 14 from the first layer 12 and/or the packaging. For example, the second adhesion value is preferably relatively lower than the first adhesion value such that, as a user peels off the second layer 14 the first layer 12 remains coupled to the packaging, thereby keeping the information 28 coupled with the packaging.

Additionally or alternatively, section 14*d* of the second layer 14 may have a relatively low adhesion value compared to section 14*c* such that, during removal, section 14*c* remains coupled with section 12*c* of the first layer and thereby maintains a physical connection between information 44, 40 and the packaging. In such an embodiment, the second layer preferably tears along perforation 26 when section 14*d* is removed from the packaging/first layer 12.

In one embodiment, the perforation 26 of the second layer may be off-set (along the length 14*b*/12*b*) from the perforation 24 of the first layer 12 such that the perforation 24 of the first layer 12 is covered by a non-perforated portion of the second layer 14 until the second layer 14 is at least partially removed. Such a configuration may prevent and/or reduce the likelihood that both perforations 24, 26 are inadvertently or premature broken.

The non-perforated sections of the second layer 14 may have tear strength that is relatively stronger than the non-perforated sections of the first layer 12 to prevent and/or reduce the likelihood that non-perforated sections of the second layer are inadvertently or premature broken. In such a configuration, the first and second layers may not have perforations and the first layer is instead relatively easily pierced or broken.

Figure 2:
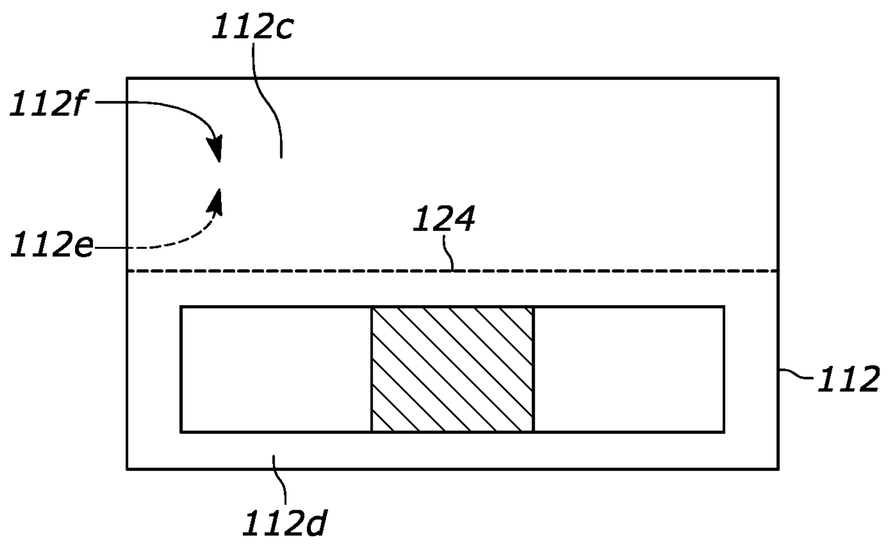
FIG. 2. Illustrates a carton closure label first layer, in accordance with various embodiments.
Figure 3:
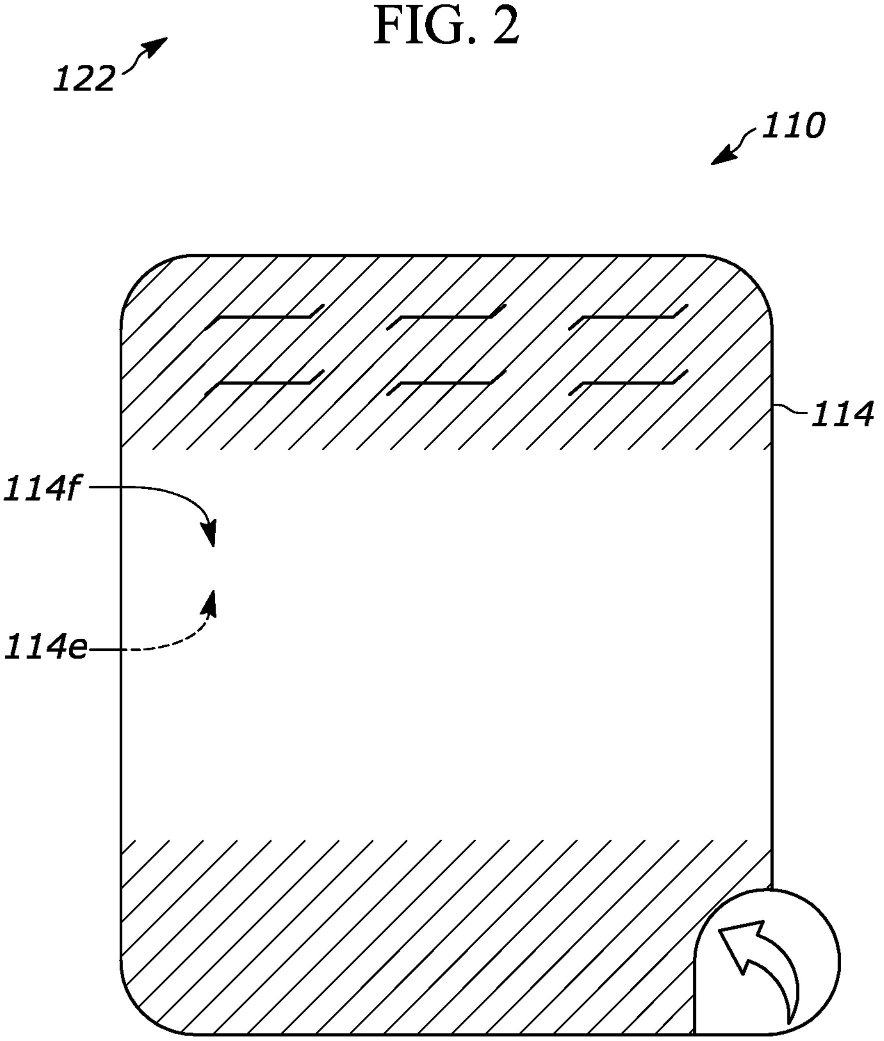
FIG. 3 illustrates a carton closure label second layer, in accordance with various embodiments.

FIGS. 2 and 3 show an alternative embodiment of the carton closure label 110, where the second layer 114 does not include a perforation line. However, in this embodiment, the first layer 112 still has a perforation line 124 for facilitating easy opening when the second layer 114 has been de-coupled from the first layer 112. For example, because the second layer 114 does not have a perforation line, the second layer 114 resists or prevents tearing of the perforation layer 124 of the first layer 112 while the respective layers are coupled. As a more specific example, the second layer 114 may prevent or resist unintended rupture of the perforation and/or separation of first and second portions 112*c*, 112*d* of the first layer 112. As a result, the carton closure label 110 may provide protection of unintended opening as well as relative easy-open features.

Both the embodiment 10 shown in FIGS. 1*a*-1*b* as well as the embodiment 110 shown in FIGS. 2-3 include adhesive layers and/or other features with adhesive properties. As a more specific example, and as shown in FIGS. 2-3 for illustrative purposes (but equally applicable to the embodiment 10 shown in FIGS. 1*a*-1*b*), the first layer 112 includes a bottom surface 112*e* (line shown in partial dashed line to signify the arrow pointing to the bottom surface) and a top surface 112*f* and the second layer includes a bottom surface 114*e* (line shown in partial dashed line) and a top surface 114*f*. The first layer bottom surface 112*e* preferably includes an adhesive coating, layer, or other adhesive properties to facilitate coupling the first layer 112 with the packaging (as discussed further below). The first layer top surface **112*f* preferably does not include an adhesive coating and instead includes a coating, layer, or other properties to facilitate relatively easy de-coupling between the first layer top surface 112*f* and the second layer bottom surface 114*e*. For example, the first layer top surface 112*f* may have low adherence qualities such as a low coefficient of friction. The second layer bottom surface 114*e* preferably includes an adhesive coating, layer, or other adhesive properties to facilitate selectively coupling the second layer 114 to the first layer 112. The second layer top surface 114*f* preferably does not include an adhesive coating and instead includes a relatively low-adhesion surface to prevent debris or other materials from sticking to the second layer 114**.

The relationship between the second layer bottom surface **114*e* and the first layer top surface 112*f* may serve as and/or facilitate tamper-resistant features. For example, the second layer bottom surface 114*e* may include an adhesive layer that, once removed from the first layer top surface 112*f*, loses its level of adhesion. As a more specific example, once removed the second layer bottom surface 114*e* may not be able to adhere to the first layer 114**. As a result, a user may be able to detect tampering or other potential security breaches of the carton closure label.

To a similar end, the relationship between the first layer bottom surface **112*e* and the packaging may also or alternatively serve as and/or facilitate tamper-resistant features. For example, the first layer bottom surface 112*e* may include an adhesive layer that, once removed from the packaging, loses its level of adhesion. As a more specific example, once removed the first layer bottom surface 112*e*** may not be able to adhere to the packaging. As a result, a user may be able to detect tampering or other potential security breaches of the carton closure label.

Figure 4:
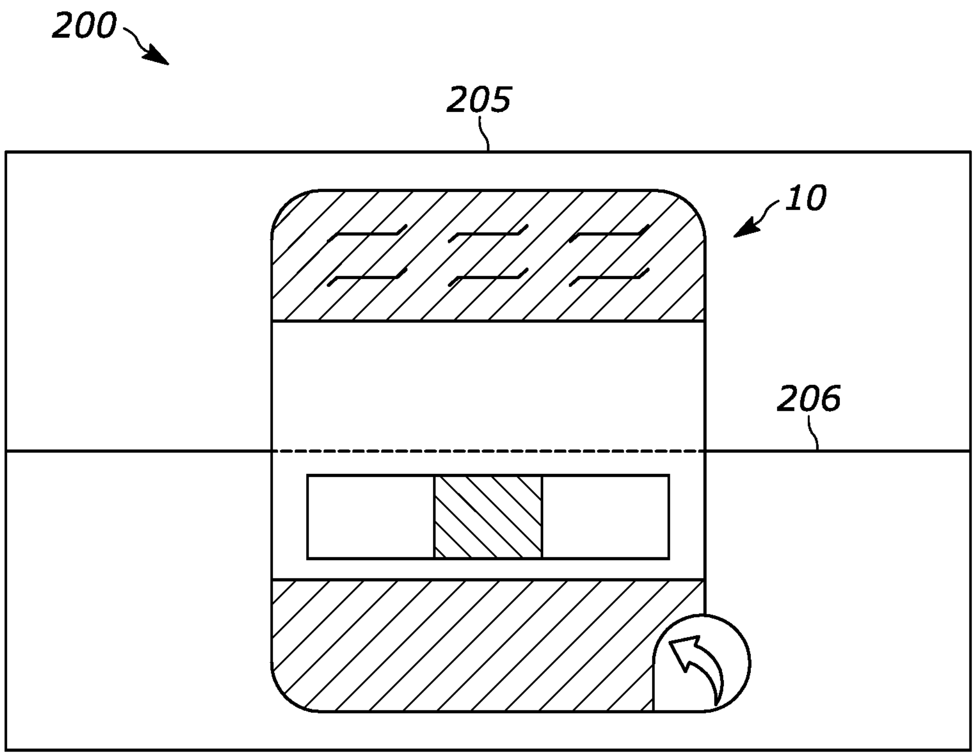
FIG. 4 illustrates a packaging assembly including a secondary packaging and a carton closure label, in accordance with various embodiments.
Figure 5:
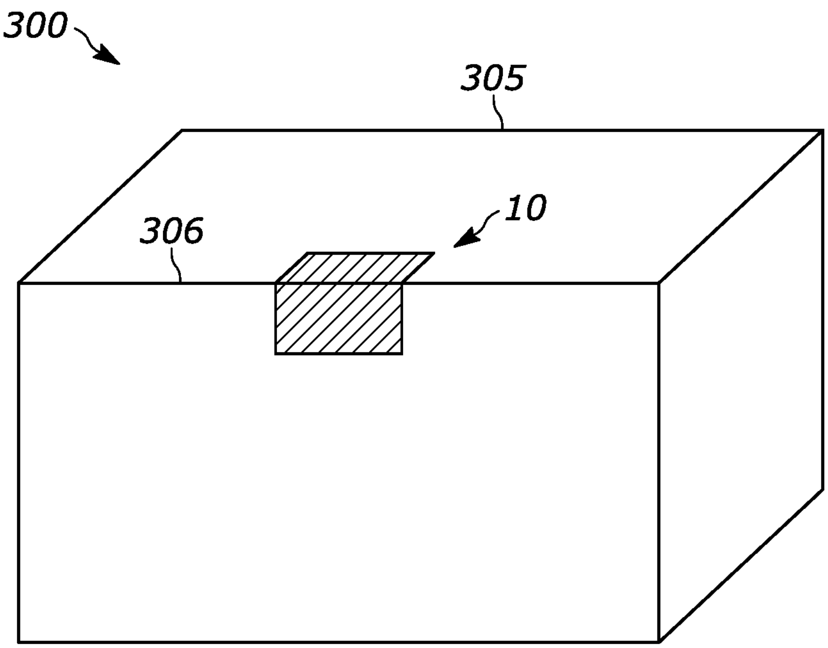
FIG. 5 illustrates a packaging assembly including a secondary packaging and a carton closure label, in accordance with various embodiments.

FIGS. 4 and 5 show exemplary packaging systems 200, 300 utilizing carton closure labels 10, 110 discussed herein. For example, FIG. 4 shows a packaging system 200 including a secondary packaging 205 (e.g., packaging used to protect and contain a primary container containing a pharmaceutical drug and/or a drug delivery device) having a packaging seam 206 where two portions of the packaging 200 come together and/or overlap with each other. For example, if the system 200 is an cardboard package then the seam 206 may be the point where a cardboard flap overlaps or otherwise meets another section of the cardboard. As another example, if the system 200 is an envelope then the seam 206 may be the point where the envelope flap meets the envelope body. The perforation(s) 24, 26, 124 may generally align with the seam 206 to facilitate opening the packaging system 200.

FIG. 5 shows another exemplary packaging system 300 where the packaging 305 is a cardboard box and the seam 306 is a generally linear line defined by the intersection of a top panel and a side panel. The perforation(s) 24, 26, 124 may generally align with the seam 306 to facilitate opening the packaging system 300.

The above description describes various devices, assemblies, components, subsystems and methods for use related to a drug delivery device. The devices, assemblies, components, subsystems, methods or drug delivery devices can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF), UDENYCA® (pegfilgrastim-cbqv), Ziextenzo® (LA-EP2006; pegfilgrastim-bmez), or FULPHILA (pegfilgrastim-bmez).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methyoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RAN KL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 145c7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa) Erythropoietin [30-asparagine, 32-threonine, 87-valine, 88-asparagine, 90-threonine], Darbepoetin alfa, novel erythropoiesis stimulating protein (NESP); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4β7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Kanjinti™ (trastuzumab-anns) anti-HER2 monoclonal antibody, biosimilar to Herceptin®, or another product containing trastuzumab for the treatment of breast or gastric cancers; Humatrope® (somatropin, Human Growth Hormone); Humira® (adalimumab); Vectibix® (panitumumab), Xgeva® (denosumab), Prolia® (denosumab), Immunoglobulin G2 Human Monoclonal Antibody to RANK Ligand, Enbrel® (etanercept, TNF-receptor/Fc fusion protein, TNF blocker), Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Solids™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); Ova-Rex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIia receptor monoclonal antibody); Actemra® (anti-IL6 Receptor mAb); Avastin® (bevacizumab), HuMax-CD4 (zanolimumab); Mvasi™ (bevacizumab-awwb); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 145c7-CHO (anti-IL15 antibody, see U.S. Pat. No. 7,153,507); Tysabri® (natalizumab, anti-α4integrin mAb); Valortim® (MDX-1303, anti-*B. anthracis* protective antigen mAb); ABthrax™ Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Ra mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5β1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNα mAb (MEDI-545, MDX-198); anti-IGF1R mAb; anti-IGF-1R mAb (HuMax-Inflam); anti-IL12 mAb (ABT-874); anti-IL12/1L23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCGβ mAb (MDX-1307); anti-mesothelin dsFv-PE38 conjugate (CAT-5001); anti-PD1mAb (MDX-1106 (ONO- 4538)); anti-PDGFRα antibody (IMC-3G3); anti-TGFβ mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, BPS 804 (Novartis), Evenity™ (romosozumab-aqqg), another product containing romosozumab for treatment of postmenopausal osteoporosis and/or fracture healing and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoV-EXGALV/CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. In some embodiments, the drug delivery device may contain or be used with Aimovig® (erenumab-aooe), anti-human CGRP-R (calcitonin gene-related peptide type 1 receptor) or another product containing erenumab for the treatment of migraine headaches. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BITE®) antibodies such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure. In some embodiments, the drug delivery device may contain or be used with Avsola™ (infliximab-axxq), anti-TNF a monoclonal antibody, biosimilar to Remicade® (infliximab) (Janssen Biotech, Inc.) or another product containing infliximab for the treatment of autoimmune diseases. In some embodiments, the drug delivery device may contain or be used with Kyprolis® (carfilzomib), (2S)—N—((S)-1-((S)-4-methyl-1-((R)-2-methyloxiran-2-yl)-1-oxopentan-2-ylcarbamoyl)-2-phenylethyl)-2-((S)-2-(2-morpholinoacetamido)-4-phenylbutanamido)-4-methylpentanamide, or another product containing carfilzomib for the treatment of multiple myeloma. In some embodiments, the drug delivery device may contain or be used with Otezla® (apremilast), N-[2-[(1S)-1-(3-ethoxy-4-methoxyphenyl)-2-(methylsulfonyl) ethyl]-2,3-dihydro-1,3-dioxo-1H-isoindol-4-yl]acetamide, or another product containing apremilast for the treatment of various inflammatory diseases. In some embodiments, the drug delivery device may contain or be used with Parsabiv™ (etelcalcetide HCl, KAI-4169) or another product containing etelcalcetide HCl for the treatment of secondary hyperparathyroidism (sHPT) such as in patients with chronic kidney disease (KD) on hemodialysis. In some embodiments, the drug delivery device may contain or be used with ABP 798 (rituximab), a biosimilar candidate to Rituxan®/MabThera™ or another product containing an anti-CD20 monoclonal antibody. In some embodiments, the drug delivery device may contain or be used with a VEGF antagonist such as a non-antibody VEGF antagonist and/or a VEGF-Trap such as aflibercept (Ig domain 2 from VEGFR1 and Ig domain 3 from VEGFR2, fused to Fc domain of IgG1). In some embodiments, the drug delivery device may contain or be used with ABP 959 (eculizumab), a biosimilar candidate to Soliris®, or another product containing a monoclonal antibody that specifically binds to the complement protein C5. In some embodiments, the drug delivery device may contain or be used with Rozibafusp alfa (formerly AMG 570) is a novel bispecific antibody-peptide conjugate that simultaneously blocks ICOSL and BAFF activity. In some embodiments, the drug delivery device may contain or be used with Omecamtiv mecarbil, a small molecule selective cardiac myosin activator, or myotrope, which directly targets the contractile mechanisms of the heart, or another product containing a small molecule selective cardiac myosin activator. In some embodiments, the drug delivery device may contain or be used with Sotorasib (formerly known as AMG 510), a $KRAS^{G12C}$ small molecule inhibitor, or another product containing a $KRAS^{G12C}$ small molecule inhibitor. In some embodiments, the drug delivery device may contain or be used with Tezepelumab, a human monoclonal antibody that inhibits the action of thymic stromal lymphopoietin (TSLP), or another product containing a human monoclonal antibody that inhibits the action of TSLP. In some embodiments, the drug delivery device may contain or be used with AMG 714, a human monoclonal antibody that binds to Interleukin-15 (IL-15) or another product containing a human monoclonal antibody that binds to Interleukin-15 (IL-15). In some embodiments, the drug delivery device may contain or be used with AMG 890, a small interfering RNA (siRNA) that lowers lipoprotein(a), also known as Lp(a), or another product containing a small interfering RNA (siRNA) that lowers lipoprotein(a). In some embodiments, the drug delivery device may contain or be used with ABP 654 (human IgG1 kappa antibody), a biosimilar candidate to Stelara®, or another product that contains human IgG1 kappa antibody and/or binds to the p40 subunit of human cytokines interleukin (IL)-12 and IL-23. In some embodiments, the drug delivery device may contain or be used with Amjevita™ or Amgevita™ (formerly ABP 501) (mab anti-TNF human IgG1), a biosimilar candidate to Humira®, or another product that contains human mab anti-TNF human IgG1. In some embodiments, the drug delivery device may contain or be used with AMG 160, or another product that contains a half-life extended (HLE) anti-prostate-specific membrane antigen (PSMA)×anti-CD3 BiTE® (bispecific T cell engager) construct. In some embodiments, the drug delivery device may contain or be used with AMG 119, or another product containing a delta-like ligand 3 (DLL3) CART (chimeric antigen receptor T cell) cellular therapy. In some embodiments, the drug delivery device may contain or be used with AMG 119, or another product containing a delta-like ligand 3 (DLL3) CART (chimeric antigen receptor T cell) cellular therapy. In some embodiments, the drug delivery device may contain or be used with AMG 133, or another product containing a gastric inhibitory polypeptide receptor (GIPR) antagonist and GLP-1R agonist. In some embodiments, the drug delivery device may contain or be used with AMG 171 or another product containing a Growth Differential Factor 15 (GDF15) analog.

In some embodiments, the drug delivery device may contain or be used with AMG 176 or another product containing a small molecule inhibitor of myeloid cell leukemia 1 (MCL-1). In some embodiments, the drug delivery device may contain or be used with AMG 199 or another product containing a half-life extended (HLE) bispecific T cell engager construct (BITE®). In some embodiments, the drug delivery device may contain or be used with AMG 256 or another product containing an anti-PD-1×IL21 mutein and/or an IL-21 receptor agonist designed to selectively turn on the Interleukin 21 (IL-21) pathway in programmed cell death-1 (PD-1) positive cells. In some embodiments, the drug delivery device may contain or be used with AMG 330 or another product containing an anti-CD33×anti-CD3 BiTE® (bispecific T cell engager) construct. In some embodiments, the drug delivery device may contain or be used with AMG 404 or another product containing a human anti-programmed cell death-1(PD-1) monoclonal antibody being investigated as a treatment for patients with solid tumors. In some embodiments, the drug delivery device may contain or be used with AMG 427 or another product containing a half-life extended (HLE) anti-fms-like tyrosine kinase 3 (FLT3)×anti-CD3 BiTE® (bispecific T cell engager) construct. In some embodiments, the drug delivery device may contain or be used with AMG 430 or another product containing an anti-Jagged-1 monoclonal antibody. In some embodiments, the drug delivery device may contain or be used with AMG 506 or another product containing a multi-specific FAP×4-1BB-targeting DARPin® biologic under investigation as a treatment for solid tumors. In some embodiments, the drug delivery device may contain or be used with AMG 509 or another product containing a bivalent T-cell engager and is designed using XmAb® 2+1 technology. In some embodiments, the drug delivery device may contain or be used with AMG 562 or another product containing a half-life extended (HLE) CD19×CD3 BiTE® (bispecific T cell engager) construct. In some embodiments, the drug delivery device may contain or be used with Efavaleukin alfa (formerly AMG 592) or another product containing an IL-2 mutein Fc fusion protein. In some embodiments, the drug delivery device may contain or be used with AMG 596 or another product containing a CD3× epidermal growth factor receptor vIII (EGFRvIII) BiTE® (bispecific T cell engager) molecule. In some embodiments, the drug delivery device may contain or be used with AMG 673 or another product containing a half-life extended (HLE) anti-CD33×anti-CD3 BiTE® (bispecific T cell engager) construct. In some embodiments, the drug delivery device may contain or be used with AMG 701 or another product containing a half-life extended (HLE) anti-B-cell maturation antigen (BCMA)×anti-CD3 BiTE® (bispecific T cell engager) construct. In some embodiments, the drug delivery device may contain or be used with AMG 757 or another product containing a half-life extended (HLE) anti-delta-like ligand 3 (DLL3)×anti-CD3 BiTE® (bispecific T cell engager) construct. In some embodiments, the drug delivery device may contain or be used with AMG 910 or another product containing a half-life extended (HLE) epithelial cell tight junction protein claudin 18.2×CD3 BiTE® (bispecific T cell engager) construct.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A carton closure label comprising:

a first layer having a first adhesion value and a perforated portion extending at least substantially across a dimension of the first layer; and a second layer overlapping the first layer and removably coupled with the first layer, the second layer having a second adhesion value that is less than the first adhesion value.

2. A carton closure label of claim 1, wherein the second layer is positioned over the first layer such that a bottom side of the second layer contacts a top side of the first layer, and wherein the second layer covers at least a substantial portion of the first layer.

3. A carton closure label of claim 1, wherein the second layer includes a peel-up portion facilitating grip of the second layer for removal from the first layer.

4. A carton closure label of claim 1, wherein the second layer does not include a perforated portion.

5. A carton closure label of claim 1, wherein the first layer has a first tear strength and the second layer has a second tear strength that is lower than the first tear strength.

6. A carton closure label of claim 1, wherein the second layer is at least partially transparent such that label information on the first layer is visible when the first and second layers are coupled with each other.

7. A carton closure label comprising:

a first layer having a first adhesion value and a perforated portion extending at least substantially across a dimension of the first layer; and a second layer removably coupled with the first layer, the second layer having a second adhesion value that is less than the first adhesion value, wherein the second layer includes an adhesive that, when de-coupled from the first layer, significantly loses an adhesive strength between the first and second layers.

8. A carton closure label of claim 7, wherein the second layer is positioned over the first layer such that a bottom side of the second layer contacts a top side of the first layer, and wherein the second layer covers at least a substantial portion of the first layer.

9. A carton closure label of claim 7, wherein the second layer includes a peel-up portion facilitating grip of the second layer for removal from the first layer.

10. A carton closure label of claim 7, wherein the second layer does not include a perforated portion.

11. A carton closure label of claim 7, wherein the first layer has a first tear strength and the second layer has a second tear strength that is lower than the first tear strength.

12. A carton closure label of claim 7, wherein the second layer is at least partially transparent such that label information on the first layer is visible when the first and second layers are coupled with each other.

13. A packaging assembly for a pharmaceutical product comprising:

a secondary packaging for receiving a pharmaceutical product; and a carton closure label coupled with the secondary packaging, the carton closure label having:

a first layer having a first adhesion value and a perforated portion extending at least substantially across a dimension of the first layer, the first layer having a bottom side coupled with the secondary packaging; and a second layer overlapping the first layer and removably coupled with the first layer, the second layer having a second adhesion value that is less than the first adhesion value.

14. A packaging assembly as in claim 13, wherein the second layer is positioned over the first layer such that a bottom side of the second layer contacts a top side of the first layer, and wherein the second layer covers at least a substantial portion of the first layer.

15. A packaging assembly as in claim 13, wherein the second layer includes a peel-up portion facilitating grip of the second layer for removal from the first layer.

16. A packaging assembly as in claim 13, wherein the second layer does not include a perforated portion.

17. A packaging assembly as in claim 13, wherein a connection between the first layer and the secondary packaging has a first tear strength and a connection between the second layer and the first layer has a second tear strength that is lower than the first tear strength.

18. A packaging assembly as in claim 13, wherein the first layer has a first tear strength and the second layer has a second tear strength that is lower than the first tear strength.

19. A packaging assembly as in claim 13, wherein the second layer is at least partially transparent such that label information on the first layer is visible when the first and second layers are coupled with each other.

20. A packaging assembly as in claim 13, wherein the second layer includes an adhesive that, when de-coupled from the first layer, significantly loses an adhesive strength between the first and second layers.

* * * * *